(12) United States Patent
Moehlenkamp

(10) Patent No.: US 7,405,490 B2
(45) Date of Patent: Jul. 29, 2008

(54) WIND TURBINE FOR PRODUCING ELECTRICAL POWER AND A METHOD OF OPERATING THE SAME

(75) Inventor: Georg Moehlenkamp, Grossbeeren (DE)

(73) Assignee: Converteam GmbH, Berlin (DE)

( * ) Notice: Subject to any disclaimer, the term of this patent is extended or adjusted under 35 U.S.C. 154(b) by 0 days.

(21) Appl. No.: 11/542,257

(22) Filed: Oct. 4, 2006

(65) Prior Publication Data
US 2007/0029802 A1 Feb. 8, 2007

Related U.S. Application Data

(62) Division of application No. 10/442,136, filed on May 21, 2003, now Pat. No. 7,190,085.

(30) Foreign Application Priority Data
Apr. 8, 2003 (EP) .................. 03290876

(51) Int. Cl.
*F03D 7/02* (2006.01)
(52) U.S. Cl. ...................................... 290/44
(58) Field of Classification Search ............ 290/44
See application file for complete search history.

(56) References Cited

U.S. PATENT DOCUMENTS

| | | | |
|---|---|---|---|
| 4,193,005 A | 3/1980 | Kos et al. | |
| 4,427,897 A | 1/1984 | Migliori | |
| 5,083,039 A | 1/1992 | Richardson | |
| 5,083,077 A | 1/1992 | Wallace | |
| 5,225,712 A | 7/1993 | Erdman | |
| 5,798,632 A | 8/1998 | Muljadi | |
| 5,907,192 A | 5/1999 | Lyons et al. | |
| 6,081,104 A | 6/2000 | Kern | |
| 6,118,678 A | 9/2000 | Limpaecher et al. | |
| 6,137,187 A * | 10/2000 | Mikhail et al. | 290/44 |
| 6,344,985 B1 | 2/2002 | Akerson | |
| 6,420,795 B1 * | 7/2002 | Mikhail et al. | 290/44 |
| 6,420,796 B1 * | 7/2002 | Lagerwey | 290/44 |
| 6,437,996 B1 | 8/2002 | Wobben | |
| 6,566,764 B2 * | 5/2003 | Rebsdorf et al. | 290/44 |
| 6,750,633 B2 | 6/2004 | Schreiber | |

(Continued)

FOREIGN PATENT DOCUMENTS

EP 1467094 A1 * 10/2004

(Continued)

OTHER PUBLICATIONS

Extended European Search Report dated Sep. 29, 2003.

(Continued)

*Primary Examiner*—Joseph Waks
(74) *Attorney, Agent, or Firm*—Harness, Dickey & Pierce, P.L.C.

(57) ABSTRACT

A wind turbine includes a turbine rotor with at least one blade and a generator with a rotor and a stator. The turbine rotor is mechanically coupled with the rotor of the generator. A diode rectifier is electrically coupled to the stator of the generator. A direct current link is electrically coupled with the diode rectifier. A line converter is electrically coupled with the direct current link.

3 Claims, 1 Drawing Sheet

U.S. PATENT DOCUMENTS

| | | | |
|---|---|---|---|
| 6,812,586 B2 | 11/2004 | Wacknov et al. | |
| 6,815,934 B2* | 11/2004 | Colley | 322/47 |
| 6,825,575 B1 | 11/2004 | Edelson | |
| 6,856,038 B2* | 2/2005 | Rebsdorf et al. | 290/44 |
| 7,042,110 B2* | 5/2006 | Mikhail et al. | 290/44 |
| 7,061,133 B1* | 6/2006 | Leijon et al. | 290/44 |
| 7,071,579 B2* | 7/2006 | Erdman et al. | 290/55 |
| 7,095,131 B2* | 8/2006 | Mikhail et al. | 290/44 |
| 7,180,202 B2* | 2/2007 | Wobben | 290/44 |
| 2002/0079706 A1* | 6/2002 | Rebsdorf et al. | 290/55 |
| 2003/0151259 A1* | 8/2003 | Feddersen et al. | 290/44 |
| 2004/0046530 A1* | 3/2004 | Hessling | 322/29 |
| 2004/0075278 A1* | 4/2004 | Canini et al. | 290/44 |
| 2004/0169497 A1* | 9/2004 | Colley | 323/212 |
| 2005/0127880 A1* | 6/2005 | Colley | 322/7 |
| 2005/0225090 A1* | 10/2005 | Wobben | 290/44 |
| 2006/0142899 A1* | 6/2006 | Wobben | 700/286 |

FOREIGN PATENT DOCUMENTS

| | | |
|---|---|---|
| JP | 59213299 A | 12/1984 |
| JP | 2000073933 | 3/2000 |
| WO | WO 00/74198 | 12/2000 |

OTHER PUBLICATIONS

Mohan, Ned, et al. *Power Electronics: Converters, Applications and Design*: 1989, pp. 33-38, 66-67, 75-76, 81-82, 129-133.

Grauers, A. "Efficiency of Three Phase Wind Generation Systems," IEEE Transactions on Energy Conversion, vol. 11, No. 3, Sep. 1996, p. 652.

* cited by examiner

WIND TURBINE FOR PRODUCING ELECTRICAL POWER AND A METHOD OF OPERATING THE SAME

This is a divisional of U.S. application Ser. No. 10/442,136, filed May 21, 2003 now U.S. Pat. No. 7,190,085; the contents of which is hereby incorporated in its entirety by reference.

Pursuant to the provisions of 35 U.S.C. 119, this Application claims priority to European Application No. 03 290 876.6, filed Apr. 8, 2003 in the European Intellectual Property Office, the disclosure of which is incorporated herein in its entirety by reference.

FIELD OF THE INVENTION

The present invention generally relates to a wind turbine for producing electrical power and to a method of operating a wind turbine.

BACKGROUND OF THE INVENTION

Wind turbines for producing electrical power are generally known. In particular, wind turbines with variable speed are well known. On one hand, the speed of these wind turbines depends on the actual wind situation. However, on the other hand, the electrical power to be produced may not vary. Instead, the electrical power must be delivered with a fixed frequency e.g. to a utility grid.

SUMMARY OF THE INVENTION

An object of the present invention is to provide an improved wind turbine for producing electrical power.

As well, it is an object of the present invention to provide an improved method of operating a wind turbine for producing electrical power.

According to one embodiment of the present invention, a wind turbine for producing electrical power includes a turbine rotor with at least one blade, a generator with a rotor and a stator, the turbine rotor being mechanically coupled with the rotor of the generator, a diode rectifier being electrically coupled to the stator of the generator, a direct current link being electrically coupled with the diode rectifier, and a line converter being electrically coupled with the direct current link.

According to another embodiment of the present invention, a method of operating a wind turbine, the wind turbine includes a turbine rotor with at least one blade, a generator with a rotor and a stator, the turbine rotor being mechanically coupled with the rotor of the generator, a diode rectifier being electrically coupled to the stator of the generator, a direct current link being electrically coupled with the diode rectifier, and a line converter being electrically coupled with the direct current link, and the method comprising measuring an actual power flowing through the line converter and adjusting the actual power to a given desired power of the wind turbine.

Further features, applications and advantages of the present invention will become apparent from the following description of exemplary embodiments of the present invention which are illustrated in the drawings. All described and illustrated features themselves or in any combination represent the subject matter of the present invention, independently of their wording in the description or of their representation in the drawings and independently of their combination in the claims or the dependencies of the claims.

DETAILED DESCRIPTION OF EXEMPLARY EMBODIMENTS

Figure 1:
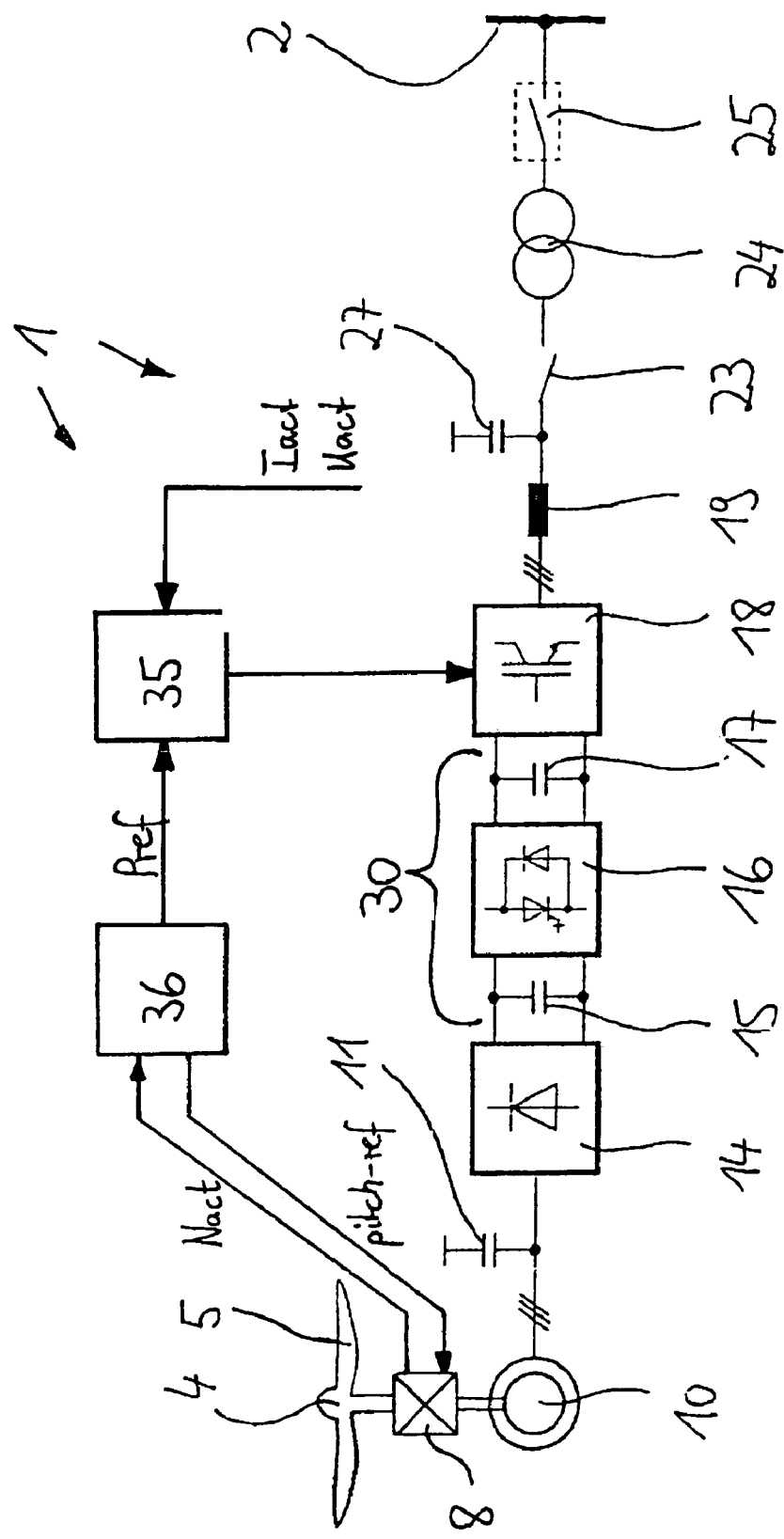
FIG. 1 illustrates a schematic block diagram of an exemplary embodiment of a variable speed wind turbine according to the present invention.

FIG. 1 illustrates a variable speed wind turbine 1 that supplies electrical power with a fixed frequency to a utility grid 2.

The wind turbine 1 includes a turbine rotor 4 with at least one rotor blade 5. The pitch of the blade 5 is variable and may be controlled. The turbine rotor 4 is mounted on a rotatable shaft. The turbine rotor 4 is mechanically coupled by the shaft to a gear box 8 which is mechanically coupled by a further rotatable shaft to the rotor of a three-phase synchronous generator 10.

The gear box 8 includes a step-up speed transmission with a fixed ratio so that the rotor of the generator 10 rotates at a fixed multiple speed of the turbine rotor 4.

The generator 10 produces a three-phase alternating output current with a variable frequency that is proportional to the speed of the turbine rotor 4. The output voltage of the generator 10 depends on its speed and its flux. In case of constant flux, the output voltage of the generator 10 is proportional to the speed of the turbine rotor 4.

The generator 10 is excited by permanent magnets. Alternatively, the generator 10 can be excited electrically. In this case, excitation current can be supplied via slip rings or brushless by a transformer and rotating diodes.

Three-phase electricity is provided at power terminals of the stator of the generator 10. A three-phase capacitor 11 is connected to these terminals of the generator 10. The capacitor 11 supplies reactive power for commutation purposes.

The alternating output current generated by the generator 10 is converted from its variable frequency to a fixed frequency by a power converter. This power converter includes a diode rectifier 14, a direct current link 15 with a variable voltage, a step-up/step-down converter 16, a direct current link 17 with a fixed voltage, a line converter 18 and a filter 19.

The direct current link 15 with the variable voltage, the step-up/step-down converter 16 and the direct current link 17 with the fixed voltage represent a direct current link 30. It is possible that the direct current link 15 with the variable frequency may be omitted and that the function of this direct current link 15 may be integrated into the capacitor 11 and/or the diode rectifier 14.

The diode rectifier 14 includes multiple pairs of diodes arranged in a bridge topology between a positive and a negative direct current rail of the direct current link 15 and each of the power terminals of the stator of the generator 10.

Examples of such rectifiers are described in Power Electronics; Converters, Applications and Design; by Ned Mohan et. al.; ISBN 0-471-61342-8, the entire contents of which are herein hereby incorporated by reference.

The stator current and thereby the electrical power flowing from the generator 10 to the direct current link 15 depends on the actual output voltage of the generator 10, on the actual variable voltage of the direct current link 15 as well as on the stray inductance of the generator 10.

The fixed voltage of the direct current link 17 must be higher than the rectified line side voltage of the line converter 18.

In case that the voltage fluctuation of the direct current link 15 to the line converter 18 is not sufficient, the step-up/step-down converter 16 can be used to convert the actual variable voltage of the direct current link 15 to a desired voltage at the direct current link 17. The step-up/step-down converter 16 includes one or two active switches and one or two diodes in a so-called buck, boost or buck-boost topology. Examples of such step-up/step-down converters are described in Power Electronics; Converters, Applications and Design; by Ned Mohan et. al.; ISBN 0-471-61342-8.

An advantageous exemplary embodiment of the variable speed wind turbine 1 provides a maximum of the fixed voltage of the direct current link 17 according to the requirements of the line converter 18 and a maximum of the variable voltage of the direct current link 15 at maximum speed and maximum power of the wind turbine 1. In this operating point, the step-up/step-down converter 16 only has to connect the two direct current links 15, 17 to minimize losses of the converter 16.

The two direct current links 15 and 17 remain connected down to a minimum possible voltage of the direct current link 17 according to the requirements of the line converter 18. If the output voltage of the generator 10 or the variable voltage of the direct current link 15 is below this limit, the step-up/step down converter 16 converts the power from the lower variable voltage of the direct current link 15 to the higher fixed voltage of the direct current link 17.

The line converter 18 includes three pairs of active switching devices arranged in a bridge topology between a positive direct current rail and a negative direct current rail of the direct current link 17. Examples of such line converters are described in Power Electronics; Converters, Applications Design; by Ned Mohan et. al.; ISBN 0-471-61342-8.

The intermediate points of the pairs of the switching devices form output terminals from which three-phase electricity flows to the filter 19. The line converter 18 produces a three-phase alternating output current with a fixed frequency.

The output of the filter 19 is connected to a transformer 24 via a low voltage switch 23. The output of the transformer 24 is connected to the utility grid 2 via a medium voltage switch 25. A three-phase capacitor 27 may be connected to the output of the filter 19.

The line converter 18 is controlled by a control unit 35. A desired power Pref and thereby the torque of the wind turbine 1 is provided to this control unit 35. The actual power flowing through the line converter 18 is evaluated based on measured actual current Iact and a measured actual voltage Uact on the line side of the line converter 18. This actual power is adjusted to the desired power Pref by the control unit 35.

The power flow from the direct current link 17 to the utility grid 2 has a direct impact on the actual variable voltage of the direct current link 15 and therewith on the alternating output current of the generator 10. For example, if the power into the utility grid 2 increases, the variable voltage of the direct current link 15 decreases, and, due to the described mechanism of the diode rectifier 14, the alternating output current of the generator 10 increases. Vice versa, if the power into the utility grid 2 decreases, the variable voltage of the direct current link 15 increases, and the alternating output current of the generator 10 decreases.

This self-controlling effect is valid not only at maximum speed and maximum power of the wind turbine 1, i.e. if the step up/step down converter 16 only connects the two direct current links 15, 17, but it is also valid for a lower speed of the wind turbine 1. In the latter case, the step up/step down converter 16 controls the direct current link 17 to its fixed voltage with the consequence that the voltage at the direct current link 15 decreases and the alternating output current of the generator 10 increases.

The desired power Pref provided to the control unit 35, may be generated by a controller 36. In this case, a sensor for measuring the speed Nact of the rotor 4 and means for controlling the variable pitch of the rotor blade 5 may be provided e.g. within the gear box 8 and may be coupled with the controller 36. Furthermore, sensors for measuring the speed and the direction of the wind may be coupled with the controller 36. The controller 36 may then evaluate the desired power Pref based on the speed of the rotor 4, on the pitch of the rotor blade 5, on the speed and the direction of the wind and/or on further operating values of the wind turbine 1.

Furthermore, the controller 36 may include a control unit for controlling the speed of the rotor 4. For that purpose, the means for controlling the pitch of the rotor blade 5 may be adjusted by a reference signal pitch-ref with the consequence that the measured actual speed Nact of the rotor 4 changes. The actual speed Nact may then be controlled to a desired speed of the rotor 4.

Exemplary embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method of operating a wind turbine, the wind turbine comprising a turbine rotor with at least one blade, a generator with a rotor and a stator, the turbine rotor being mechanically coupled with the rotor of the generator, a diode rectifier being electrically coupled to the stator of the generator, a direct current link being electrically coupled with the diode rectifier, and a line converter being electrically coupled with the direct current link, and the method comprising:
   measuring an actual power flowing through the line converter; and
   adjusting the actual power to a given desired power of the wind turbine.

2. The method of claim 1, further comprising evaluating the desired power based on a speed of the rotor, a pitch of the rotor blade, a speed and direction of wind and/or on further operating values of the wind turbine.

3. The method of claim 1, further comprising controlling an actual speed (Nact) of the rotor by adjusting a pitch of the rotor blade.

* * * * *